United States Patent
Miwa et al.

(10) Patent No.: US 12,403,927 B2
(45) Date of Patent: Sep. 2, 2025

(54) DRIVER ASSISTANCE SYSTEM AND DRIVER ASSISTANCE METHOD

(71) Applicant: HONDA MOTOR CO., LTD., Tokyo (JP)

(72) Inventors: Shinya Miwa, Tokyo (JP); Minoru Suzuki, Tokyo (JP); Kazuya Yokota, Tokyo (JP); Hiromitsu Ishibashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

(21) Appl. No.: 18/398,762

(22) Filed: Dec. 28, 2023

(65) Prior Publication Data

US 2024/0262376 A1    Aug. 8, 2024

(30) Foreign Application Priority Data

Feb. 2, 2023   (JP) .................................. 2023-014758

(51) Int. Cl.
*B60W 50/14* (2020.01)
*B60L 58/13* (2019.01)
*B60W 40/105* (2012.01)

(52) U.S. Cl.
CPC ............ *B60W 50/14* (2013.01); *B60L 58/13* (2019.02); *B60W 40/105* (2013.01); *B60L 2250/16* (2013.01); *B60L 2260/52* (2013.01); *B60W 2050/146* (2013.01); *B60W 2510/244* (2013.01); *B60W 2556/40* (2020.02)

(58) Field of Classification Search
CPC .............. B60W 50/14; B60W 40/105; B60W 2050/146; B60W 2510/244; B60W 2556/40; B60L 58/13; B60L 2250/16; B60L 2260/52; B60L 58/12; B60L 2260/54; B60K 35/00; G01C 21/3667
See application file for complete search history.

(56) References Cited

FOREIGN PATENT DOCUMENTS

JP    2020-145784 A    9/2020
JP    2021-39064 A     3/2021

*Primary Examiner* — Brian A Zimmerman
*Assistant Examiner* — Cal J Eustaquio
(74) *Attorney, Agent, or Firm* — Rankin, Hill & Clark LLP

(57) ABSTRACT

A driver assistance system includes a calculation unit for calculating a cruising range as a distance at which an electric vehicle can travel with a current remaining charged amount of the electric vehicle, and an information presentation unit for displaying, on a display, a reachable range from a current position of the vehicle. The calculation unit calculates an open road cruising range in a case where an open road is used and/or an expressway cruising range in a case where an expressway is used. The information presentation unit displays an open road reach range and an expressway reach range such that an end point of the expressway reach range in a case where the expressway is used is located closer to the current position of the vehicle than an outer edge of the open road reach range in a case where the open road is used.

10 Claims, 8 Drawing Sheets

DRIVER ASSISTANCE SYSTEM AND DRIVER ASSISTANCE METHOD

INCORPORATION BY REFERENCE

The present application claims priority under 35 U.S.C. § 119 to Japanese Patent Application No. 2023-014758 filed on Feb. 2, 2023. The content of the application is incorporated herein by reference in its entirety.

BACKGROUND THE INVENTION

Field of Invention

The present invention relates to a driver assistance system for assisting a driver of an electric vehicle, and a driver assistance method.

DESCRIPTION OF THE RELATED ART

In recent years, research and development about power charging and feeding in a mobility incorporating a secondary battery that contributes to energy efficiency have been conducted to ensure an access to sustainable and advanced energy that is reliable and reasonable for a larger number of people.

Japanese Patent Laid-Open No. 2020-145784 discusses a technique for calculating a reference charged amount required for an electric vehicle to reach a set destination and providing a user with a notification for prompting the user to charge a battery in a case where the reference charged amount is less than a remaining charged amount of the battery.

Japanese Patent Laid-Open No. 2021-39064 discusses a technique for calculating reachable nodes which an electric car can reach with a current remaining charged amount in each orientation based on a current position of the electric car, and displaying a region graphic generated by connecting the reachable nodes in each orientation on a map.

In the technique for power charging and feeding in a mobility incorporating a secondary battery, a cruising range for which the vehicle can travel within the range of the remaining charged amount of the secondary battery is dependent on a traveling speed. Therefore, a problem to be solved by the invention is to effectively assist a driver to select various traveling roads, including an open road and an expressway, and to select a speed on each road.

To solve the above-described problem, an object of the present invention is to effectively assist a driver to select a traveling road and/or select a speed on each road so as to achieve a longer cruising range. This contributes to energy efficiency.

SUMMARY OF THE INVENTION

One aspect of the present invention is a driver assistance system including: a calculation unit configured to calculate a cruising range as a distance at which a vehicle to be driven by power supplied from a battery can travel with a current remaining charged amount of the battery; and an information presentation unit configured to display, on a display device, a reachable range as a reachable position range within the cruising range from a current position of the vehicle. The calculation unit calculates an open road cruising range as the cruising range in a case where an open road is used and/or an expressway cruising range as the cruising range in a case where a nearest expressway from the current position is used. The information presentation unit displays an open road reach range and an expressway reach range such that an end point of the expressway reach range as the reachable range in a case where the expressway is used is located closer to the current position of the vehicle than an outer edge of the open road reach range as the reachable range in a case where the open road is used.

According to another aspect of the present invention, the driver assistance system further includes a display control unit configured to display, on the display device, the open road reach range and/or the expressway reach range in cooperation with the information presentation unit. The display control unit displays the open road reach range and the expressway reach range in a superimposed manner on a map.

According to still another aspect of the present invention, the vehicle includes a maximum efficiency vehicle speed as a vehicle speed at which electricity consumption is maximum and largest in electricity consumption characteristics indicating a relationship between the vehicle speed of the vehicle and the electricity consumption as a mileage of the vehicle per unit capacity of the battery, and in a case where the vehicle is traveling at a vehicle speed exceeding the maximum efficiency vehicle speed and the remaining charged amount of the battery is less than a predetermined threshold, the information presentation unit provides an occupant of the vehicle with a notification indicating that the cruising range increases as the vehicle speed is decreased.

According to still one more aspect of the present invention, the vehicle includes a maximum efficiency vehicle speed as a vehicle speed at which electricity consumption is maximum and largest in electricity consumption characteristics indicating a relationship between the vehicle speed of the vehicle and the electricity consumption as a mileage of the vehicle per unit capacity of the battery, and in a case where a current vehicle speed of the vehicle exceeds the maximum efficiency vehicle speed and it is determined that the vehicle cannot reach a destination at the current vehicle speed based on the electricity consumption characteristics, the information presentation unit provides an occupant of the vehicle with a notification about the vehicle speed at which the vehicle can reach the destination based on a current destination and the current position of the vehicle.

According to still one more aspect of the present invention, in a case where the vehicle has entered an expressway, the information presentation unit outputs, to an occupant of the vehicle, a recommendation notification indicating that the cruising range increases as the vehicle speed is decreased.

According to still one more aspect of the present invention, in a case where a distance between a position of the expressway and the current position of the vehicle on a map is less than or equal to a predetermined value and a current vehicle speed of the vehicle is more than or equal to a predetermined value, the information presentation unit determines that the vehicle is traveling on the expressway.

According to still one more aspect of the present invention, the information presentation unit outputs the recommendation notification in a case where a predetermined time has elapsed from time when it is determined that the vehicle is traveling on the expressway.

According to still one more aspect of the present invention, the open road reach range and/or the expressway reach range is displayed on a mobile terminal device.

According to still one more aspect of the present invention, the calculation unit calculates the open road cruising range based on an average vehicle speed on the open road, the current remaining charged amount, and electricity consumption characteristics indicating a relationship between the vehicle speed of the vehicle and electricity consumption as a mileage of the vehicle per unit capacity of the battery, and/or calculates the expressway cruising range based on an average vehicle speed on the expressway, the current remaining charged amount, and the electricity consumption characteristics.

Still one more aspect of the present invention is a driver assistance method to be executed by a computer, the driver assistance method including: a calculation step of calculating a cruising range as a distance at which a vehicle to be driven by power supplied from a battery can travel with a current remaining charged amount of the battery; and an information presentation step of displaying, on a display device, a reachable range as a reachable position range within the cruising range from a current position of the vehicle. In the calculation step, an open road cruising range as the cruising range in a case where an open road is used and/or an expressway cruising range as the cruising range in a case where a nearest expressway from the current position is used is calculated. In the information presentation step, an open road reach range and an expressway reach range are displayed such that an end point of the expressway reach range as the reachable range in a case where the expressway is used is located closer to the current position of the vehicle than an outer edge of the open road reach range as the reachable range in a case where the open road is used.

According to the present invention, it is possible to effectively assist a driver to select a traveling road and/or select a speed so as to achieve a longer cruising range of a vehicle to be driven by power supplied from a battery.

DETAILED DESCRIPTION OF THE PREFERRED EMBODIMENTS

Embodiments of the present invention will be described below with reference to the drawings.

1. Configuration of Driver Assistance System

Figure 1:
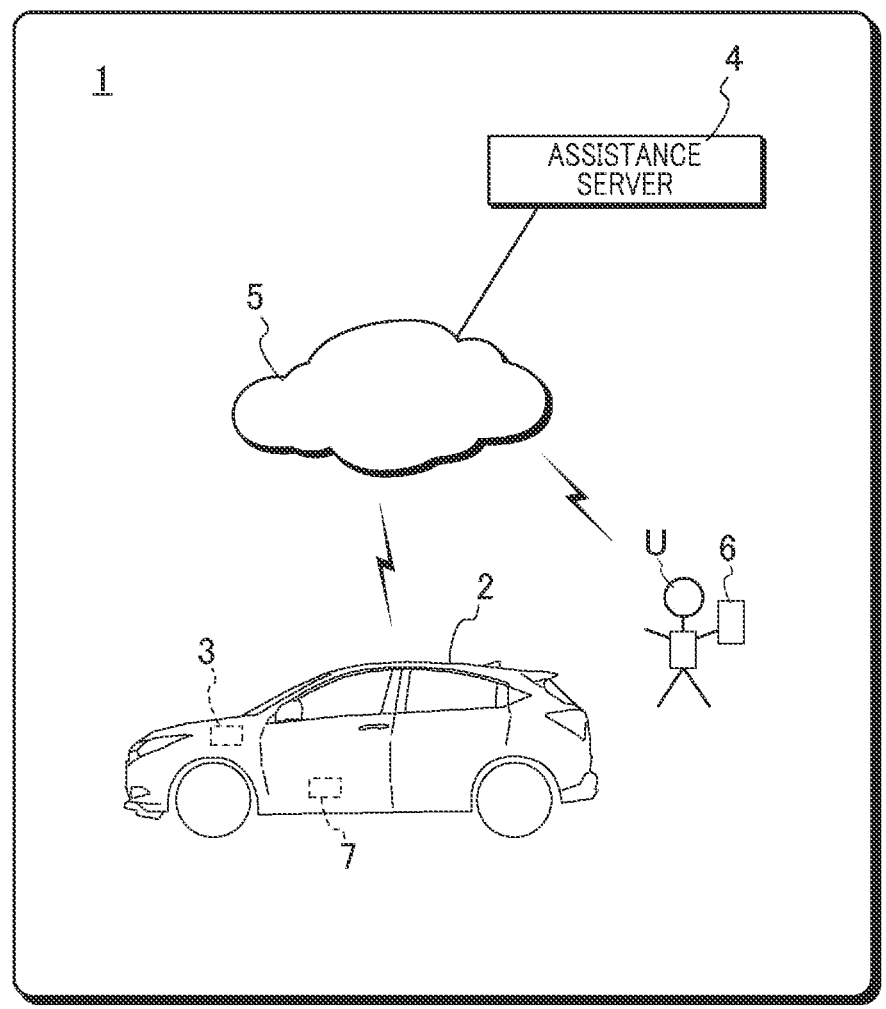
FIG. 1 illustrates a configuration of a driver assistance system according to an embodiment of the present invention.

FIG. 1 illustrates a configuration of a driver assistance system 1 according to an embodiment of the present invention. The driver assistance system 1 includes an information provision apparatus 3, which is mounted on a vehicle 2, an assistance server 4 serving as a server apparatus provided on the outside of the vehicle 2, and a terminal device 6 that is owned by a user U who uses the vehicle 2. The information provision apparatus 3, the assistance server 4, and the terminal device 6 are communicably connected with one another via a communication network 5 such as the Internet.

The vehicle 2 is an electric vehicle to be driven by power supplied from an in-vehicle battery 7. In the present embodiment, the vehicle 2 is, for example, an electric car. In the case of driving the vehicle 2, the user U carries the terminal device 6 into the vehicle 2 and acquires various information supplied from the driver assistance system 1 from the terminal device 6. Hereinafter, an "occupant of the vehicle 2" is referred to as the user U that has got into the vehicle 2 as a driver carrying the terminal device 6 into the vehicle.

The terminal device 6 is a portable mobile terminal device. The terminal device 6 may be, for example, a mobile terminal such as a smartphone or a tablet PC, or a portable terminal such as a laptop PC.

2. Outline of Operation of Alert System

The driver assistance system 1 starts an operation upon triggered by the assistance server 4 receiving an assistance request from the user U via the terminal device 6. The assistance server 4 is composed of a computer. Upon receiving the assistance request, the assistance server 4 collects information about a current position of the vehicle 2, a current remaining charged amount of the battery 7, electricity consumption characteristics, and the like from the information provision apparatus 3 mounted on the vehicle 2. In response to receiving a map request from the terminal device 6 while the vehicle 2 stops, the assistance server 4 calculates a cruising range as a distance at which the vehicle 2 can travel with the current remaining charged amount, and calculates a reachable range as a reachable position range within the cruising range from the current position of the vehicle 2. Then, the assistance server 4 displays the calculated reachable range on a display device (in the present embodiment, a touch panel 32 of the terminal device 6 to be described below). While the vehicle 2 is traveling, the assistance server 4 outputs a message including an advice for setting a vehicle speed to the user U as the occupant of the vehicle 2 via the terminal device 6 in terms of increase in the cruising range (that is, in terms of improvement in electricity consumption).

2.1 Output of Information about Reachable Range

While the vehicle 2 stops (e.g., before the vehicle 2 starts traveling, or when the vehicle stops at an intersection or a road shoulder), in response to receiving the map request from the terminal device 6, the assistance server 4 calculates an open road cruising range as the cruising range in a case where the vehicle 2 travels on an open road and also calculates the expressway cruising range as the cruising range in a case where the vehicle 2 travels on a nearest expressway from the current position (in other words, an expressway into which the vehicle 2 can enter from a nearest entrance). The term "cruising range" used herein refers to a distance at which the vehicle 2 can travel with the current remaining charged amount of the battery 7. Here, the open road is a general road that can be used by both vehicles and pedestrians, and the expressway is a controlled-access highway that is dedicated to vehicles.

Further, the assistance server 4 displays an open road reach range as the reachable range based on the open road cruising range and an expressway reach range as the reachable range based on the expressway cruising range on the touch panel 32 of the terminal device 6. Calculations of the cruising range and the reachable range will be described in detail below.

Figure 8:
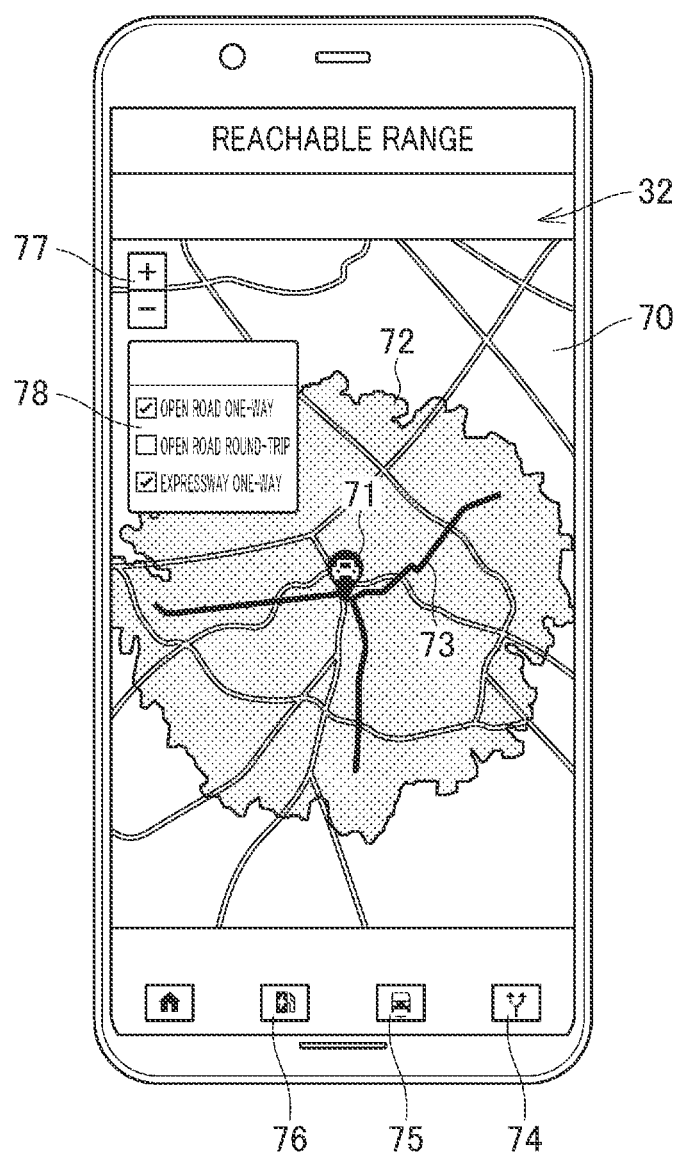
FIG. 8 illustrates an example display of a reachable range.

FIG. 8 illustrates a display example of the open road reach range and the expressway reach range on the terminal device 6 serving as a smartphone. An open road reach range 72 is, for example, a range of a closed region obtained by connecting farthest reachable positions along each travel route based on the current position (position indicated by a vehicle icon 71) of the vehicle 2. An expressway reach range 73 is a linear range along the expressway from the current position to an arrival point on the expressway at which the vehicle 2 can finally reach after the vehicle 2 enters the nearest expressway and travels in the expressway cruising range. As illustrated in FIG. 8, the open road reach range 72 and the expressway reach range 73 are displayed in a superimposed manner on a map 70, for example, on the terminal device 6. FIG. 8 will be described in more detail below.

In the present embodiment, in particular, the assistance server 4 displays the open road reach range 72 and the expressway reach range 73 such that an end point (i.e., a farthest reachable point) of the expressway reach range 73 is located closer to the current position of the vehicle 2 than an outer edge of the open road reach range 72.

In general, the electricity consumption characteristics (relationship between the electricity consumption and the vehicle speed) in an electric car are different from the fuel efficiency characteristics (relationship between the fuel efficiency and the vehicle speed or rotational speed) of a vehicle to be driven by an internal-combustion engine. The vehicle speed at which the electricity consumption in the electric car is largest is lower than the vehicle speed (e.g., 80 km/h) at which the fuel efficiency in the vehicle to be driven by the internal-combustion engine is largest. Accordingly, the user who is accustomed to driving a vehicle to be driven by the internal-combustion engine tends to think that the cruising range of an electric car can also be increased by increasing the vehicle speed on an expressway, like the vehicle to be driven by the internal-combustion engine. However, increasing the vehicle speed may lead to a reduction in the cruising range of the electric car.

In the electricity consumption characteristics of a small electric car including a smaller driving motor, the electricity consumption at a vehicle speed exceeding a maximum efficiency vehicle speed is further reduced. Accordingly, the difference between the expected cruising range and the actual cruising range as described above may be more conspicuous in a small electric car.

In the present embodiment, the reach ranges are displayed such that an end point of the expressway reach range is located closer to the current position of the vehicle 2 than an outer edge of the open road reach range. Accordingly, even if the user U is not accustomed to driving an electric car, a situation where the user accidentally uses an expressway in expectation of increasing the cruising range and is embarrassed to know that the cruising range is reduced unexpectedly can be avoided.

2.2 Output of Message for Advice

While the vehicle 2 is traveling, the assistance server 4 outputs a message for advice (hereinafter, also referred to as an advice message) in terms of increase in the cruising range or in terms of improvement in the electricity consumption to the user U of the vehicle 2 via the terminal device 6. Examples of this advice may include an advice for adjusting the vehicle speed on an expressway, such as a message "the cruising range can be increased by decreasing the current vehicle speed", and a message "you can reach the destination by decreasing the vehicle speed to ** km/h". This advice is also output from the terminal device 6, for example, in the form of an audio message or a text message, which does not require any request or operation from the user U, that is, as a so-called push notification.

This configuration enables the user U to select an appropriate vehicle speed for increasing the cruising range even if the user is not accustomed to driving an electric car.

The information provision apparatus 3, the terminal device 6, and the assistance server 4 will be sequentially described below.

3. Configuration of Information Provision Apparatus

The information provision apparatus 3 included in the vehicle 2 will now be described. The information provision apparatus 3 provides the assistance server 4 with information about the current position of the vehicle 2, the current remaining charged amount of the battery 7 included in the vehicle 2, the electricity consumption characteristics of the vehicle 2, and other characteristics and/or states of the vehicle 2.

Figure 2:
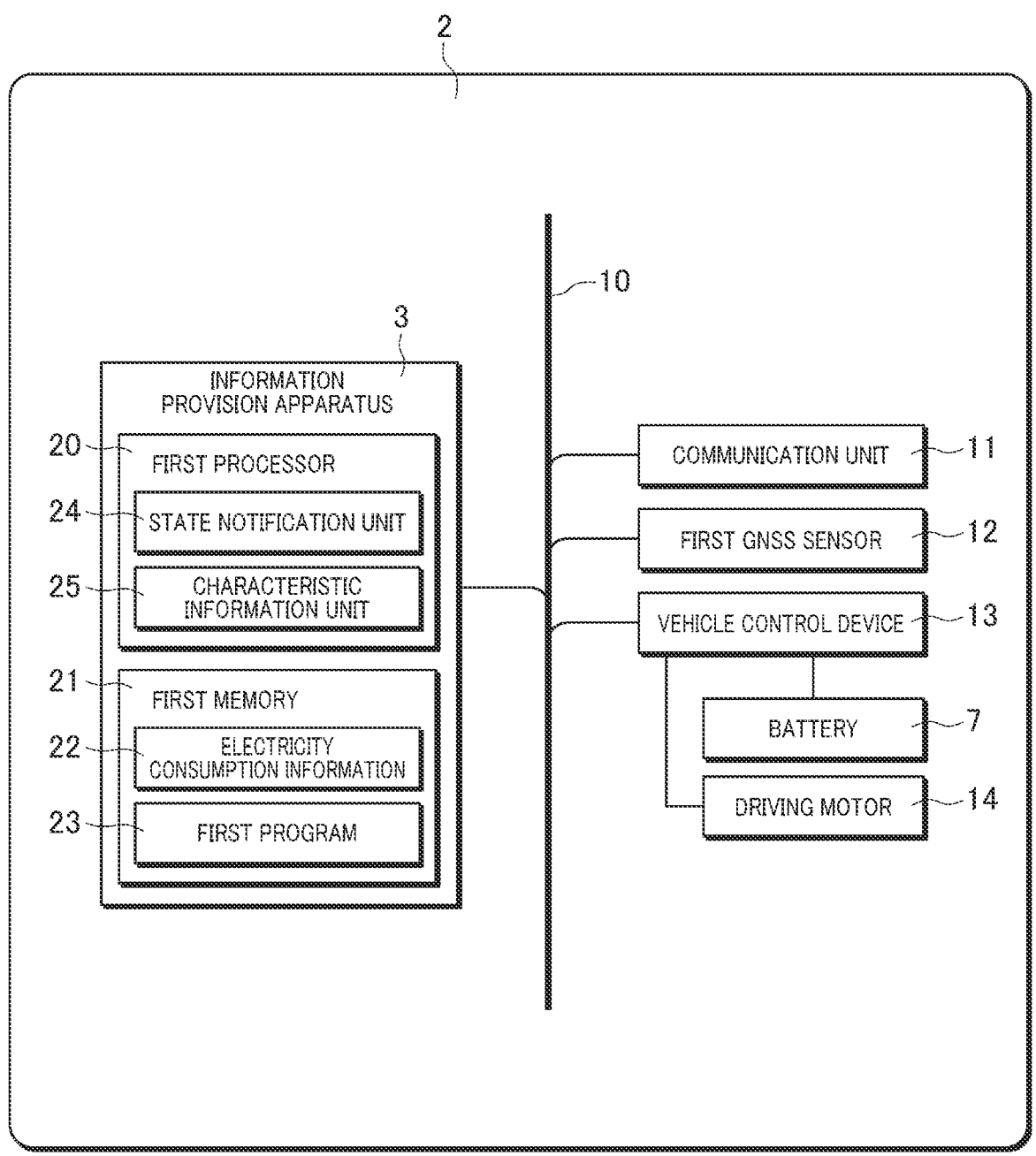
FIG. 2 is a block diagram illustrating a configuration of an information provision apparatus that constitutes the driver assistance system and is included in a vehicle.

FIG. 2 illustrates a configuration of the information provision apparatus 3. The information provision apparatus 3 is communicably connected to a communication unit 11, a first GNSS sensor 12, and a vehicle control device 13, which are mounted on the vehicle 2, via a vehicle network bus 10 included in the vehicle 2. The communication unit 11 includes a wireless communication device such as a transmitter and a receiver for the information provision apparatus 3 to communicate with the assistance server 4 via the communication network 5 that is outside of the vehicle 2. The communication unit 11 may further include a wireless communication device for short-range wireless communication such as Bluetooth® with the terminal device 6 of the user U and/or a wired communication device for wired communicating via a USB or the like. The first GNSS sensor 12 communicates with a satellite constituting a Global Navigation Satellite System (GNSS), and acquires information about the current position of the vehicle 2.

The vehicle control device 13 controls energization to the driving motor 14 from the battery 7 to control the traveling operation of the vehicle 2, detects or measures the current vehicle speed of the vehicle 2 (hereinafter, also referred to as the current vehicle speed) and the current remaining charged amount of the battery 7 at a predetermined time interval, and outputs the detection or measurement result to the information provision apparatus 3.

The information provision apparatus 3 includes a first processor 20 and a first memory 21. The first memory 21 is composed of, for example, a volatile semiconductor memory and/or a nonvolatile semiconductor memory, and/or a hard disk device or the like. The first memory 21 preliminarily stores, for example, electricity consumption information 22 as information about the electricity consumption characteristics of the vehicle 2. In the present embodiment, the electricity consumption characteristics refer to data indicating the dependency of the vehicle speed on the electricity consumption (in other words, values indicating electricity consumption for each value of various vehicle speeds).

The first processor 20 is, for example, a computer including a CPU or the like. The first processor 20 may be a configuration that includes a ROM into which programs are written, a RAM for temporarily storing data, or the like. The first processor 20 includes a state notification unit 24 and a characteristic information unit 25 as functional elements or functional units.

The functional elements included in the first processor 20 is implemented such that, for example, the first processor 20, which is a computer, executes a first program 23 stored in the first memory 21. The first program 23 can be stored in any computer-readable storage medium. Alternatively, all or some of the above-described functional elements included in the first processor 20 can also be each configured by hardware including one or more electronic circuit components.

The state notification unit 24 continuously acquires information about the current position and the current vehicle speed of the vehicle 2 and the current remaining charged amount of the battery 7 from the first GNSS sensor 12 and the vehicle control device 13. Upon receiving the information request from the assistance server 4, the state notification unit 24 transmits the information about the current position, the current vehicle speed, and the remaining charged amount that have been continuously acquired to the assistance server 4 via the communication unit 11 at a predetermined time interval.

Upon receiving the information request from the assistance server 4, the characteristic information unit 25 reads out the electricity consumption information 22 including the electricity consumption characteristics of the vehicle 2 indicating the relationship between the vehicle speed and the electricity consumption from the first memory 21, and transmits the electricity consumption information 22 to the assistance server 4.

Figure 7:
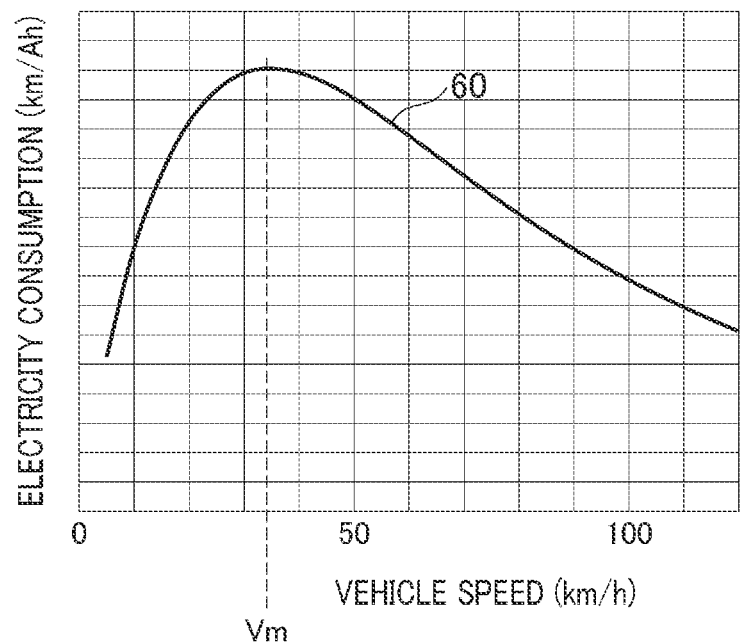
FIG. 7 illustrates an example of electricity consumption characteristics.

FIG. 7 is a graph illustrating an example of the electricity consumption characteristics of the vehicle 2. In FIG. 7, the horizontal axis represents the vehicle speed, and the vertical axis represents the electricity consumption. A line 60 indicates a graph illustrating the relationship between the vehicle speed and the electricity consumption of the vehicle 2.

As illustrated in FIG. 7, the electricity consumption characteristics of an electric car are generally unimodal like the fuel efficiency characteristics of a vehicle to be driven by an internal-combustion engine (variation characteristics of the fuel efficiency with respect to the vehicle speed), and there is a specific vehicle speed at which the electricity consumption is maximum and largest. This vehicle speed is herein referred to as the maximum efficiency vehicle speed.

The maximum efficiency vehicle speed of a vehicle to be driven by an internal-combustion engine is generally about 80 km/h, while the maximum efficiency vehicle speed of an electric car is lower than that of the vehicle to be driven by the internal-combustion engine and can be about 30 km/h to 40 km/h. In the example illustrated in FIG. 7, a maximum efficiency vehicle speed Vm of the vehicle 2 is, for example, about 35 km/h.

The characteristic information unit 25 transmits, to the assistance server 4, information that indicates, for example, a graph or a map representing the electricity consumption characteristics as illustrated in FIG. 7 and is included in the electricity consumption information 22.

The characteristic information unit 25 may acquire the current vehicle speed and the current position of the vehicle 2 and the current remaining charged amount of the battery 7 from the first GNSS sensor 12 and the vehicle control device 13 at a predetermined time interval, and may calculate the current electricity consumption characteristics of the vehicle 2. In this case, the characteristic information unit 25 can correct the electricity consumption characteristics included in the electricity consumption information 22 stored in the first memory 21 based on the calculated electricity consumption characteristics, and can transmit the corrected electricity consumption characteristics to the assistance server 4.

For example, the characteristic information unit 25 can correct the electricity consumption characteristics by multiplying a constant of proportionality, which is obtained by dividing the electricity consumption at a specific vehicle speed indicated by the calculated electricity consumption characteristics by the electricity consumption at the specific vehicle speed indicated by the electricity consumption characteristics included in the electricity consumption information 22, by the electricity consumption at each vehicle speed indicated by the electricity consumption characteristics included in the electricity consumption information 22.

4. Configuration of Terminal Device

Next, the terminal device 6 owned by the user U of the vehicle 2 will be described. As described above, the terminal device 6 is a mobile terminal device. In the present embodiment, the terminal device 6 is, for example, a smartphone. The terminal device 6 displays the reachable range of the vehicle 2 as map information in response to an instruction from the assistance server 4, and outputs an advice to be given in terms of increasing the cruising range to the user U.

Figure 3:
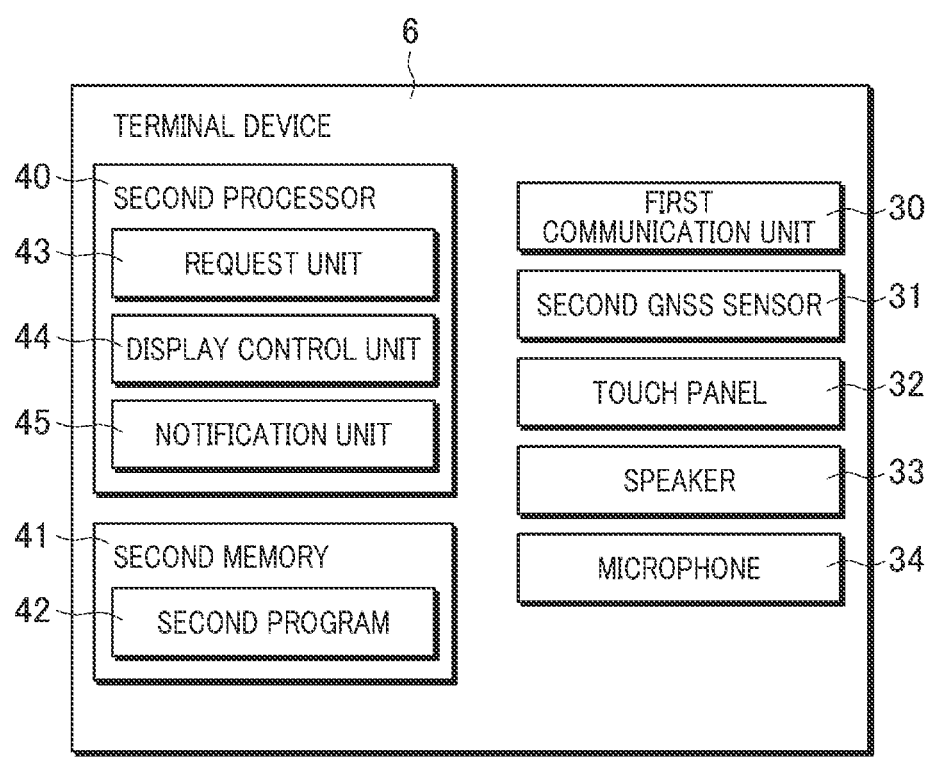
FIG. 3 is a block diagram illustrating a configuration of a terminal device that constitutes the driver assistance system and is owned by a user.

FIG. 3 illustrates a configuration of the terminal device 6. The terminal device 6 includes a first communication unit 30, a second GNSS sensor 31, the touch panel 32, a speaker 33, and a microphone 34. The first communication unit 30 is a wireless communication device for the terminal device 6 to communicate with the assistance server 4 via the communication network 5. The first communication unit 30 includes a transmitter and a receiver. The second GNSS sensor 31 communicates with a satellite constituting the GNSS, and acquires information about the current position of the terminal device 6. The touch panel 32 is a display device for displaying the open road reach range and/or the expressway reach range according to the present disclosure.

The terminal device 6 includes a second processor 40 and a second memory 41. The second memory 41 is composed of, for example, a volatile semiconductor memory and/or a nonvolatile semiconductor memory or the like.

The second processor 40 is, for example, a computer including a CPU or the like. The second processor 40 may be a configuration that includes a ROM into which programs are written, a RAM for temporarily storing data, or the like. The second processor 40 includes a request unit 43, a display control unit 44, and a notification unit 45 as functional elements or functional units.

These functional elements included in the second processor 40 are implemented such that, for example, the second processor 40, which is a computer, executes a second program 42 stored in the second memory 41. The second program 42 is, for example, an application program, and can be used after being downloaded from a program distribution server (not illustrated) or the like connected to the communication network 5, or after reading out the program preliminarily stored in any computer-readable storage medium from the storage medium. Alternatively, all or some of the above-described functional elements included in the second processor 40 may be each configured by hardware including one or more electronic circuit components.

The request unit 43 transmits an assistance request to the assistance server 4 in response to an instruction from the user U input via the touch panel 32. When the assistance server 4 receives the assistance request, a driving assistance operation in the driver assistance system 1 is started. The assistance request includes a user ID for identifying the user U, and a vehicle ID for identifying the vehicle 2. The assistance request can also include supplementary information. The supplementary information can include, for example, destination information.

The request unit 43 transmits a map request for displaying the reachable range of the vehicle 2 to the assistance server 4 in response to an instruction from the user U input via the touch panel 32. The map request can include information about which one of a one-way range and a round-trip range is designated as the open road reach range.

The display control unit 44 displays the open road reach range and/or the expressway reach range on the touch panel 32, which is a display device, in cooperation with an information presentation unit 58 of the assistance server 4 to be described below. Specifically, upon receiving information about the open road reach range and/or the expressway reach range from the assistance server 4 in response to the map request transmitted from the request unit 43, the display control unit 44 displays the received reachable ranges on the touch panel 32. As described above, the open road reach range refers to a reachable range calculated based on the cruising range (open road cruising range) when the vehicle 2 travels on an open road. The expressway reach range refers to a reachable range calculated based on the cruising range (expressway cruising range) when the vehicle 2 enters a nearest expressway from the current position and travels on the expressway.

In response to receiving a notification instruction from the assistance server 4, the notification unit 45 displays an audio message included in the received notification instruction to the speaker 33, or displays a text message on the touch panel 32, as a so-called push notification. For example, the notification unit 45 receives the notification instruction for advice messages concerning the improvement in the electricity consumption or the improvement in the cruising range as described above from the assistance server 4, and outputs these messages as a push notification.

FIG. 8 illustrates a display example of the open road reach range and the expressway reach range displayed on the touch panel 32 of the terminal device 6. In the example illustrated in FIG. 8, the vehicle icon 71 representing the current position of the vehicle 2, the open road reach range 72, which is a closed region on the map, and the expressway reach range 73, which is a linear range along the expressway, are displayed in a superimposed manner on the map 70 indicating the peripheral area of the current position of the vehicle 2 on the touch panel 32. Thus, the open road reach range and the expressway reach range are displayed in a superimposed manner on a map. This enables the user U to intuitively and easily recognize the difference between these reach ranges.

An expressway range button 74, an open road range button 75, and a stand display button 76 are displayed on a lower portion of the touch panel 32 illustrated in FIG. 8. The user U can instruct the display control unit 44 to switch between display and non-display of the expressway reach range 73 every time the user U presses the expressway range button 74.

The open road reach range illustrated in FIG. 8 indicates the reachable range when the open road cruising range is used as a one-way distance from the current position of the vehicle 2. Optionally, an open road reach range (not illustrated in FIG. 8) may be further displayed as a round-trip range when the open road cruising range is used as a round-trip distance from the current position of the vehicle 2. For example, the user U can cause the display control unit 44 to switch between display and non-display of the open road reach range as the round-trip range every time the user U presses the open road range button 75. The open road reach range as the round-trip range and the open road reach range as the one-way range set as default information can be received from the assistance server 4 as option information.

The stand display button 76 illustrated in FIG. 8 is used to display a charging stand position in a superimposed manner on the reachable range displayed on the touch panel 32. For example, when the stand display button 76 is pressed, the request unit 43 transmits a map request including a stand display request to the assistance server 4. The display control unit 44 can receive information about the reachable range including the stand position information newly transmitted from the assistance server 4, and can update the display of the reachable range on the touch panel 32. The stand position displayed on the touch panel 32 can be deleted by pressing the stand display button 76 again.

In the example illustrated in FIG. 8, an enlargement/reduction button 77 for enlarging or reducing the scale of the map 70 and a display identification box 78 indicating which reachable range is displayed on the touch panel 32 are displayed on an upper-left portion of the touch panel 32 illustrated in FIG. 8. In the illustrated example, checkboxes corresponding to "open road one-way" and "expressway one-way", respectively, in the display identification box 78 are checked, and the reachable range currently displayed on the touch panel 32 indicates the open road reach range and the expressway reach range of the one-way range set as default reach ranges.

5. Configuration of Assistance Server

Next, the assistance server 4 will be described. The assistance server 4 collects information about the current position and the current vehicle speed of the vehicle 2, the current remaining charged amount of the battery 7, and the electricity consumption from the information provision apparatus 3 of the vehicle 2, and provides the user U with information about the reachable range and an advice in terms of improvement in electricity consumption and improvement in cruising range via the terminal device 6.

Figure 4:
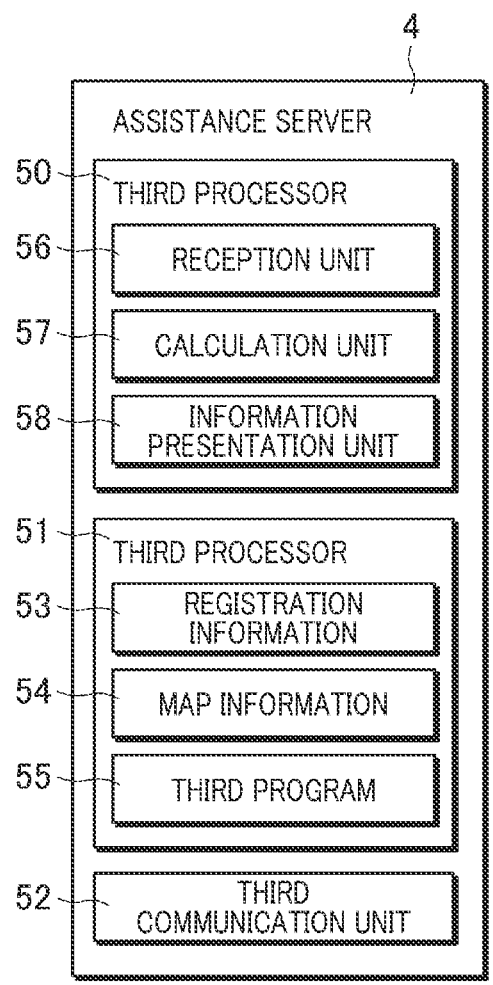
FIG. 4 illustrates a configuration of an assistance server constituting the driver assistance system.

FIG. 4 illustrates a configuration of the assistance server 4. The assistance server 4 includes a third processor 50, a third memory 51, and a third communication unit 52. The third communication unit 52 is a wireless communication device used for the assistance server 4 to communicate with each of the information provision apparatus 3 and the terminal device 6 via the communication network 5. The third communication unit 52 includes a transmitter and a receiver.

The third memory 51 is composed of, for example, a volatile semiconductor memory and/or a nonvolatile semiconductor memory, and/or a hard disk device or the like. The third memory 51 stores registration information 53 and map information 54. The registration information 53 is stored in association with a user ID for identifying the user U, a vehicle ID for identifying the vehicle 2 used by the user U, and access information for communicating with the information provision apparatus 3 of the vehicle 2. The user ID, the vehicle ID, and the access information can be preliminarily acquired from the user U via the terminal device 6, for example, according to the related art, and can be stored in the third memory 51 as the registration information 53.

The third processor 50 is, for example, a computer including a CPU or the like. The third processor 50 may be a configuration that includes a ROM into which programs are written, a RAM for temporarily storing data, or the like. The third processor 50 includes a reception unit 56, a calculation unit 57, the information presentation unit 58 as functional elements or functional units.

These functional elements included in the third processor 50 are implemented such that, for example, the third processor 50, which is a computer, executes the third program 55 stored in the third memory 51. The third program 55 can be stored in any computer-readable storage medium. Alternatively, all or some of the functional elements included in the third processor 50 can be each configured by hardware including one or more electronic circuit components.

Upon receiving the assistance request from the terminal device 6, the reception unit 56 refers to the registration information 53 in the third memory 51 and authenticates the validity of the assistance request based on the user ID included in the assistance request. For example, when the user ID included in the received assistance request is included in the registration information 53, the reception unit 56 determines that the assistance request is valid. Alternatively, when a combination of the user ID and the vehicle ID included in the received assistance request matches a combination of the user ID and the vehicle ID stored in the registration information 53, the reception unit 56 may determine that the assistance request is valid.

If the received assistance request is valid, the reception unit 56 acquires access information associated with the user ID included in the assistance request from the registration information 53. Then, the reception unit 56 communicates with the information provision apparatus 3 of the vehicle 2 using the access information, and transmits an information request to the information provision apparatus 3. As described above, in response to receiving the information request, the information provision apparatus 3 transmits electricity consumption information about the vehicle 2 to the assistance server 4 and starts transmission of the current position and the current vehicle speed of the vehicle 2 and the current remaining charged amount of the battery 7 to the assistance server 4 at a predetermined time interval.

The reception unit 56 sends an operation start instruction to the information presentation unit 58. Further, if the reception unit 56 receives a map request from the terminal device 6 when the vehicle 2 has not started traveling (i.e., while the vehicle 2 stops), the reception unit 56 sends an operation start instruction to the calculation unit 57. For example, the reception unit 56 determines that the vehicle 2 has started traveling if the current vehicle speed exceeds the predetermined value (e.g., 5 km/h).

In response to receiving the operation start instruction from the reception unit 56, the calculation unit 57 calculates a cruising range as a distance at which the vehicle 2 can travel with the current remaining charged amount. In the present embodiment, if the vehicle 2 travels on an open road, the calculation unit 57 calculates an open road cruising range as the cruising range in a case where the vehicle 2 travels on the open road, and/or if the nearest expressway from the current position can be used, the calculation unit 57 calculates the expressway cruising range as the cruising range in a case where the expressway is used.

Specifically, the calculation unit 57 calculates the cruising range of the vehicle 2 based on the electricity consumption characteristics included in the electricity consumption information transmitted from the information provision apparatus 3 of the vehicle 2, the current position, the current vehicle speed, and the current remaining charged amount of the vehicle 2 transmitted at the predetermined time interval from the information provision apparatus 3.

More specifically, the calculation unit 57 calculates the open road cruising range based on the average vehicle speed on the open road, the current remaining charged amount of the vehicle 2, and the electricity consumption characteristics of the vehicle 2. Alternatively or in addition to this, the calculation unit 57 calculates the expressway cruising range based on the average vehicle speed on the expressway, the current remaining charged amount of the vehicle 2, and the electricity consumption characteristics of the vehicle 2. Which one of the open road cruising range and the expressway cruising range, or whether to calculate both the open road cruising range and the expressway cruising range can be dynamically determined by the calculation unit 57 depending on the processing load status (e.g., the number of tasks to be subsequently processed).

Here, the expressway cruising range may be defined as the cruising range including the distance from the current position of the vehicle 2 to the nearest expressway entrance and the travel distance on the expressway. In this case, the calculation unit 57 can calculate the amount of power required for the vehicle 2 to reach the expressway entrance on the open road based on the distance of the open road, the average vehicle speed on the open road, and the electricity consumption characteristics of the vehicle 2, and can calculate the travel distance on the expressway based on the amount of power obtained by subtracting the calculated amount of power from the current remaining charged amount of the vehicle 2, the average vehicle speed on the expressway, and the electricity consumption characteristics of the vehicle 2.

The average vehicle speed on the open road and the average vehicle speed on the expressway can be preliminarily determined and stored in, for example, the third memory 51. Alternatively, these average vehicle speeds may be calculated based on the actual average vehicle speeds of the vehicle on the open road and the expressway that are obtained from another server apparatus (e.g., server apparatus that provides road traffic information) connected to the communication network 5.

The information presentation unit 58 displays the reachable range as the position range where the vehicle 2 can reach in the cruising range from the current position based on the cruising range (i.e., the open road cruising range and/or the expressway cruising range) calculated by the calculation unit 57. In the present embodiment, the information presentation unit 58 displays, as the above-described reachable range, the open road reach range as the reachable range in the case where the open road is used and the expressway reach range as the reachable range in the case where the expressway is used. In particular, in the present embodiment, the information presentation unit 58 displays the open road reach range and the expressway reach range such that an end point of the expressway reach range is located closer to the current position of the vehicle 2 than an outer edge of the open road reach range. In the present embodiment, the information presentation unit 58 transmits information about the open road reach range and/or the expressway reach range to the terminal device 6 that operates in cooperation with the assistance server 4 and instructs the terminal device 6 to display these pieces of information, thereby displaying the pieces of information on the touch panel 32 of the terminal device 6.

As described above, unlike in the fuel efficiency characteristics of a vehicle to be driven by an internal-combustion engine, in the electricity consumption characteristics in an electric car (or electric car), the maximum efficiency vehicle speed at which the electricity consumption in an electric car is largest is lower than the maximum efficiency vehicle speed at which the fuel efficiency in the vehicle to be driven by the internal-combustion engine is largest. For example, the maximum efficiency vehicle speed of the vehicle to be driven by the internal-combustion engine is typically 80 km/h, while the maximum efficiency vehicle speed of the electric car can be typically in the range of 30 km/h to 40 km/h. Accordingly, for example, if the electric car travels at 80 km/h, like the vehicle to be driven by the internal-combustion engine, on the expressway, the cruising range is shorter than that when the vehicle travels on the open road at a speed limit of 50 km/h or less. As a result, for example, if the user who is not accustomed to driving an electric car drives the vehicle 2 to travel at the same speed as that for the vehicle to be driven by the internal-combustion engine on the expressway, the cruising range is not increased as expected, so that the user may need to perform an unscheduled charging operation.

In the present embodiment, the open road reach range and the expressway reach range are displayed such that an end point of the expressway reach range is located closer to the current position of the vehicle 2 than an outer edge of the open road reach range so that the above-described tendency in the electric car can be expressed. This configuration enables the user U to appropriately recognize that the reachable range is not necessarily increased by the utilization of the expressway even if the user U is not accustomed to driving an electric car such as the vehicle 2.

Specifically, if the calculation unit 57 calculates both the open road cruising range and the expressway cruising range, the information presentation unit 58 calculates each of the open road reach range and the expressway reach range based on the calculated open road cruising range and expressway cruising range. For example, the information presentation unit 58 firstly calculates a position where the vehicle 2 can finally reach when traveling on the open road cruising range along various road routes from the current position based on the open road cruising range calculated as described above, and sets the range surrounded by the closed region obtained by connecting the positions calculated as described above on the map as the open road reach range. Alternatively, the information presentation unit 58 may calculate a farthest position where the vehicle 2 can finally reach when traveling on the open road cruising range along various road routes for each orientation based on the current position of the vehicle 2 (e.g., for each orientation range at every 15 degrees in the direction of 360 degrees based on the current position), and may set the range surrounded by the closed region obtained by connecting the positions calculated as described above on the map as the open road reach range.

Next, the information presentation unit 58 calculates an arrival point on the expressway where the vehicle 2 can finally reach after entering the nearest expressway from the current position and traveling on the expressway cruising range based on the expressway cruising range calculated by the calculation unit 57. A linear range along the expressway leading to the arrival point is set as the expressway reach range. In this case, if the expressway includes a junction, there is an arrival point where the vehicle 2 can finally reach on the branched respective expressways. In this case, the expressway reach range can be a spider-web-like range (so-called a spider map) including an expressway portion extending in different directions from the junction.

The information presentation unit 58 transmits information about the open road reach range and the expressway reach range calculated as described above and the display request to the terminal device 6 via the third communication unit 52. In response to receiving these pieces of information, the display control unit 44 in the terminal device 6 displays the open road reach range and/or the expressway reach range on a map on the touch panel 32.

In general, the average vehicle speed on the open road (e.g., 40 km/h) is lower than the average vehicle speed on the expressway (e.g., 80 km/h) and the average vehicle speed on the open road is closer to the maximum efficiency vehicle speed in the electricity consumption characteristics than the average vehicle speed on the expressway. Accordingly, the open road cruising range calculated by the calculation unit 57 based on the average vehicle speed on the open road is longer than the expressway cruising range calculated based on the average vehicle speed on the expressway. As a result, when the open road reach range and the expressway reach range calculated as described above are displayed on a map on the touch panel 32, the open road reach range and the expressway reach range are displayed such that an end point of the expressway reach range is located closer to the current position of the vehicle 2 than an outer edge of the open road reach range.

On the other hand, if the calculation unit 57 calculates the open road cruising range and does not calculate the expressway cruising range, the information presentation unit 58 firstly calculates the open road reach range in the same manner as described above based on the calculated open road cruising range described above. The information presentation unit 58 calculates the expressway reach range in the same manner as described above by setting the value obtained by multiplying a predetermined first predetermined value less than "1" by the above-described open road cruising range as the expressway cruising range. The information presentation unit 58 transmits information about the calculated open road reach range and the expressway reach range, and the display request to the terminal device 6 via the third communication unit 52. In the terminal device 6, the display control unit 44 displays the open road reach range and/or the expressway reach range on a map on the touch panel 32.

Here, the above-described first predetermined value can be a value calculated by dividing the electricity consumption at the average vehicle speed on the expressway (e.g., 80 km/h) by the electricity consumption at the average vehicle speed on the open road (e.g., 40 km/h) based on the electricity consumption characteristics of the vehicle 2. As described above, in general, the average vehicle speed on the open road is lower than the average vehicle speed on the expressway and the average vehicle speed on the open road is closer to the maximum efficiency vehicle speed in the electricity consumption characteristics than the average vehicle speed on the expressway. Accordingly, the value calculated as described above is less than "1". Thus, when the open road reach range and the expressway reach range calculated as described above are displayed on a map on the touch panel 32, the open road reach range and the expressway reach range are displayed such that an end point of the expressway reach range is located closer to the current position of the vehicle 2 than an outer edge of the open road reach range.

On the other hand, if the calculation unit 57 calculates the expressway cruising range and does not calculate the open road cruising range, the information presentation unit 58 firstly calculates the expressway reach range based on the calculated expressway cruising range as described above. Further, the information presentation unit 58 calculates the open road reach range using the value obtained by multiplying a predetermined second predetermined value exceeding "1" by the calculated expressway cruising range as the open road cruising range. The information presentation unit 58 transmits information about the calculated open road reach range and the expressway reach range, and the display request to the terminal device 6 via the third communication unit 52. In the terminal device 6, the display control unit 44 displays the open road reach range and/or the expressway reach range on a map on the touch panel 32.

The above-described second predetermined value can be a value calculated by dividing the electricity consumption at the average vehicle speed on the open road (e.g., 40 km/h) by the electricity consumption at the average vehicle speed on the expressway (e.g., 80 km/h) based on the electricity consumption characteristics of the vehicle 2. As described above, in general, the average vehicle speed on the open road is lower than the average vehicle speed on the expressway and the average vehicle speed on the open road is closer to the maximum efficiency vehicle speed in the electricity consumption characteristics than the average vehicle speed on the expressway. Accordingly, the value calculated as described above is a value exceeding "1". Thus, when the open road reach range and the expressway reach range calculated as described above are displayed on a map on the touch panel 32, the open road reach range and the expressway reach range are displayed such that an end point of the expressway reach range is located closer to the current position of the vehicle 2 than an outer edge of the open road reach range.

Further, when the vehicle 2 travels at a vehicle speed exceeding the maximum efficiency vehicle speed and the remaining charged amount of the battery 7 is less than a predetermined threshold, the information presentation unit 58 provides the occupant of the vehicle 2 (in other words, the user U who owns the terminal device 6 and drives the vehicle 2) with a notification indicating that the cruising range increases as the vehicle speed is decreased. With this configuration, the user U as the driver adjusts the vehicle speed in response to the notification, thereby making it possible to improve the cruising range. Consequently, even if the user is not accustomed to driving an electric vehicle, a situation where the cruising range is unnecessarily reduced can be avoided.

Specifically, the information presentation unit 58 determines whether the current vehicle speed of the vehicle 2 exceeds the maximum efficiency vehicle speed indicated by the electricity consumption characteristics and whether the current remaining charged amount is less than a threshold (e.g., less than full-charged amount of 20%) at a predetermined time interval based on the information about the current vehicle speed, the current remaining charged amount, and the electricity consumption characteristics acquired by the calculation unit 57 from the information provision apparatus 3 of the vehicle 2. Further, when the current vehicle speed exceeds the maximum efficiency vehicle speed and the current remaining charged amount is less than a predetermined threshold, the information presentation unit 58 instructs the terminal device 6 to output, for example, a message "the cruising range can be increased by decreasing the vehicle speed", as an audio message or a text message.

According to the instruction described above, the terminal device 6 outputs the audio message from the speaker of the terminal device 6, or displays the text message on the touch panel 32 of the terminal device 6. Here, the notification using the audio message or the text message can be output, for example, without the need for performing an operation on the terminal device 6 by the user U, as a so-called push notification.

Further, when the current vehicle speed of the vehicle 2 exceeds the maximum efficiency vehicle speed and it is determined that the vehicle 2 cannot reach the destination at the current vehicle speed based on the electricity consumption characteristics, the information presentation unit 58 provides the occupant of the vehicle 2 with a notification about the vehicle speed at which the vehicle 2 can reach the destination based on the current destination and the current position of the vehicle 2. This configuration enables the user U to adjust the vehicle speed required for reaching the destination in response to the notification, even if the user U is not accustomed to driving an electric vehicle. This leads to an improvement in user-friendliness.

Specifically, the information presentation unit 58 determines whether the assistance request received by the reception unit 56 from the terminal device 6 includes destination information. If the assistance request includes destination information, the calculation unit 57 determines whether the current vehicle speed of the vehicle 2 exceeds the maximum efficiency vehicle speed indicated by the electricity consumption characteristics and whether the vehicle 2 can reach the destination at the current vehicle speed based on the information about the current position, the current vehicle speed, the current remaining charged amount, and the electricity consumption characteristics acquired from the information provision apparatus 3 of the vehicle 2 at a predetermined time interval. The determination as to whether the vehicle can reach the destination can be made based on whether the cruising range calculated based on the current vehicle speed, the current remaining charged amount, and the electricity consumption characteristics are shorter than the total distance of shortest paths from the current position to the destination.

When the current vehicle speed of the vehicle 2 exceeds the maximum efficiency vehicle speed and it is determined that the vehicle 2 cannot reach a destination at the current vehicle speed, the information presentation unit 58 calculates an upper-limit vehicle speed at which the cruising range is more than or equal to the total distance of shortest paths from the current position to the destination based on the current remaining charged amount and the electricity consumption characteristics. Further, the information presentation unit 58 instructs the terminal device 6 to output, for example, a message "it is recommended to decrease the vehicle speed to  km/h or less to reach the destination" (in this case, " km/h" is the calculated minimum vehicle speed) in the form of an audio message or a text message based on the calculated upper-limit vehicle speed.

The terminal device 6 outputs the audio message from the speaker 33 of the terminal device 6, or displays the text message on the touch panel 32 of the terminal device 6, for example, as a push notification, according to the instruction described above.

Further, when the vehicle 2 enters the expressway, the information presentation unit 58 outputs a recommendation notification indicating to the occupant of the vehicle 2 that the cruising range increases as the vehicle speed is decreased. This configuration makes it possible to avoid a situation where if the user U accidentally uses an expressway in expectation of increasing the cruising range and is embarrassed to know that the cruising range is reduced unexpectedly.

Specifically, the information presentation unit 58 determines whether the vehicle 2 has entered the expressway based on the information about the current position and the current vehicle speed acquired by the calculation unit 57 at the predetermined time interval from the information provision apparatus 3 of the vehicle 2, and the map information 54 stored in the third memory 51. More specifically, when the distance between a position on the expressway and the current position of the vehicle 2 on the map is less than or equal to a predetermined value and the current vehicle speed of the vehicle is more than or equal to a predetermined value (e.g., 80 km/h or more), the information presentation unit 58 determines that the vehicle 2 is traveling on the expressway.

When the vehicle 2 enters the expressway, the information presentation unit 58 instructs the terminal device 6 to output, for example, a message "the cruising range can be increased by decreasing the vehicle speed", as the recommendation notification in the form of an audio message or a text message. According to the instruction, the terminal device 6 outputs the audio message from the speaker 33 of the terminal device 6, or displays the text message on the touch panel 32 of the terminal device 6, for example, as a push notification.

Here, the information presentation unit 58 may output the recommendation notification on condition that a predetermined time has elapsed from time when it is determined that the vehicle 2 is traveling on the expressway. Thus, the recommendation notification is issued during a period other than a period in which noise in the vehicle increases as driving motor sound or the like increases when the vehicle 2 is accelerating after entrance into the expressway. Therefore, the recommendation notification can be appropriately transmitted to the driver.

6. Processing in Driver Assistance System

Figure 5:
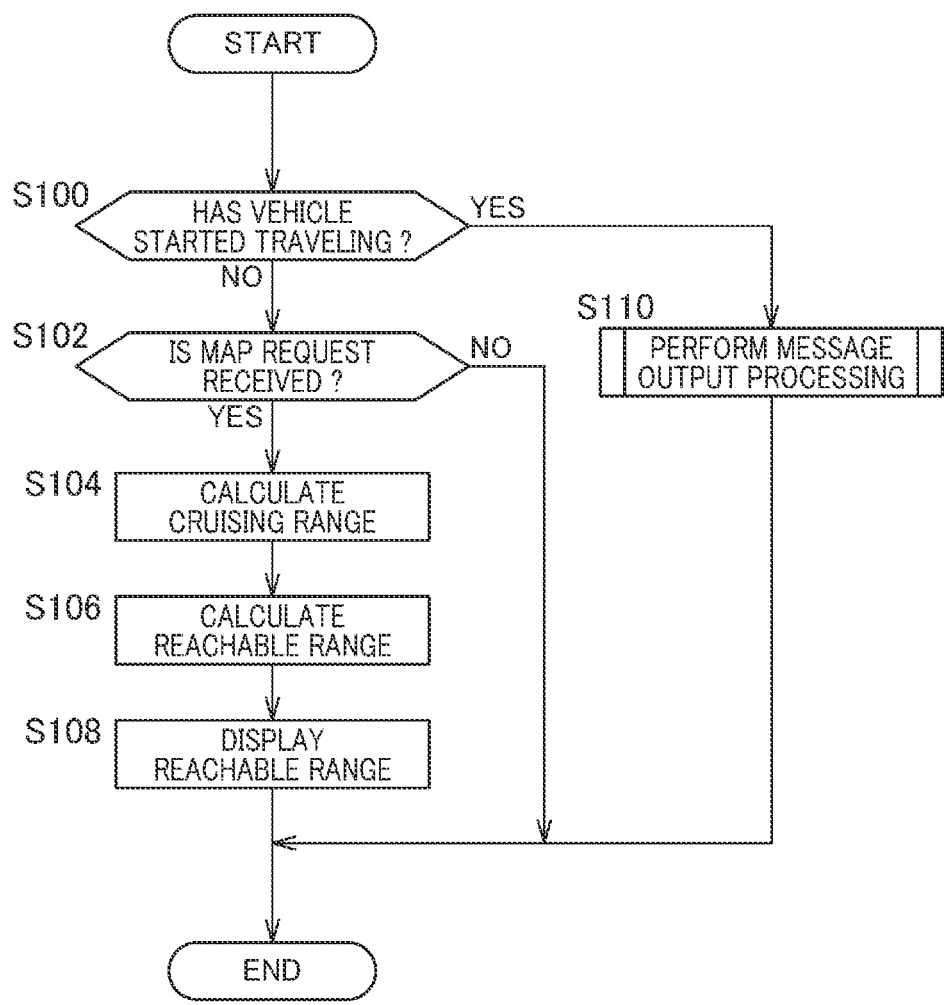
FIG. 5 is a flowchart illustrating a processing procedure in the driver assistance system.

Next, a procedure for processing in the driver assistance system 1 will be described. FIG. 5 is a flowchart illustrating a processing procedure for a driver assistance method to be executed by the first processor, the second processor, and/or the third processor, which are computers, in the driver assistance system 1. The processing illustrated in FIG. 5 is started when the assistance server 4 receives the assistance request from the terminal device 6, then is repeatedly executed until an assistance stop request is received from the terminal device 6. In parallel with this processing, the assistance server 4 transmits an information request to the information provision apparatus 3 of the vehicle 2 from the reception unit 56 when this processing is started, and then receives electricity consumption information from the information provision apparatus 3 of the vehicle 2. After this processing is started, information about the current position and the current vehicle speed of the vehicle 2 and the current remaining charged amount of the battery 7 are repeatedly received at a predetermined time interval from the information provision apparatus 3.

When the processing is started, the reception unit 56 firstly determines whether the vehicle has started traveling based on the current vehicle speed of the vehicle 2 (S100).

If the vehicle 2 has not started traveling (NO in step S100), the reception unit 56 determines whether the map request is received from the terminal device 6 (S102). If the map request is received (YES in step S102), the calculation unit 57 calculates the open road cruising range and/or the expressway cruising range based on the current remaining charged amount and the electricity consumption characteristics of the vehicle 2 (S104). The information presentation unit 58 calculates the open road reach range and the expressway reach range as the reachable range from the current position based on these cruising ranges (S106). Further, the information presentation unit 58 operates in cooperation with the terminal device 6 to display the open road reach range and/or the expressway reach range calculated as described above on the touch panel 32 serving as a display device (S108), and then this processing ends.

On the other hand, in step S100, if the vehicle 2 has started traveling (NO in step S100), the information presentation unit 58 in the assistance server executes message output processing (S110), and then this processing ends. The message output processing will be described in detail below.

As described above, after this processing ends, the driver assistance system 1 repeatedly executes the above-described processing from step S100 until the assistance server 4 receives the assistance stop request from the terminal device 6.

Here, step S104 corresponds to the calculation step according to the present disclosure. Steps S106 and S108 correspond to the information presentation step according to the present disclosure.

Figure 6:
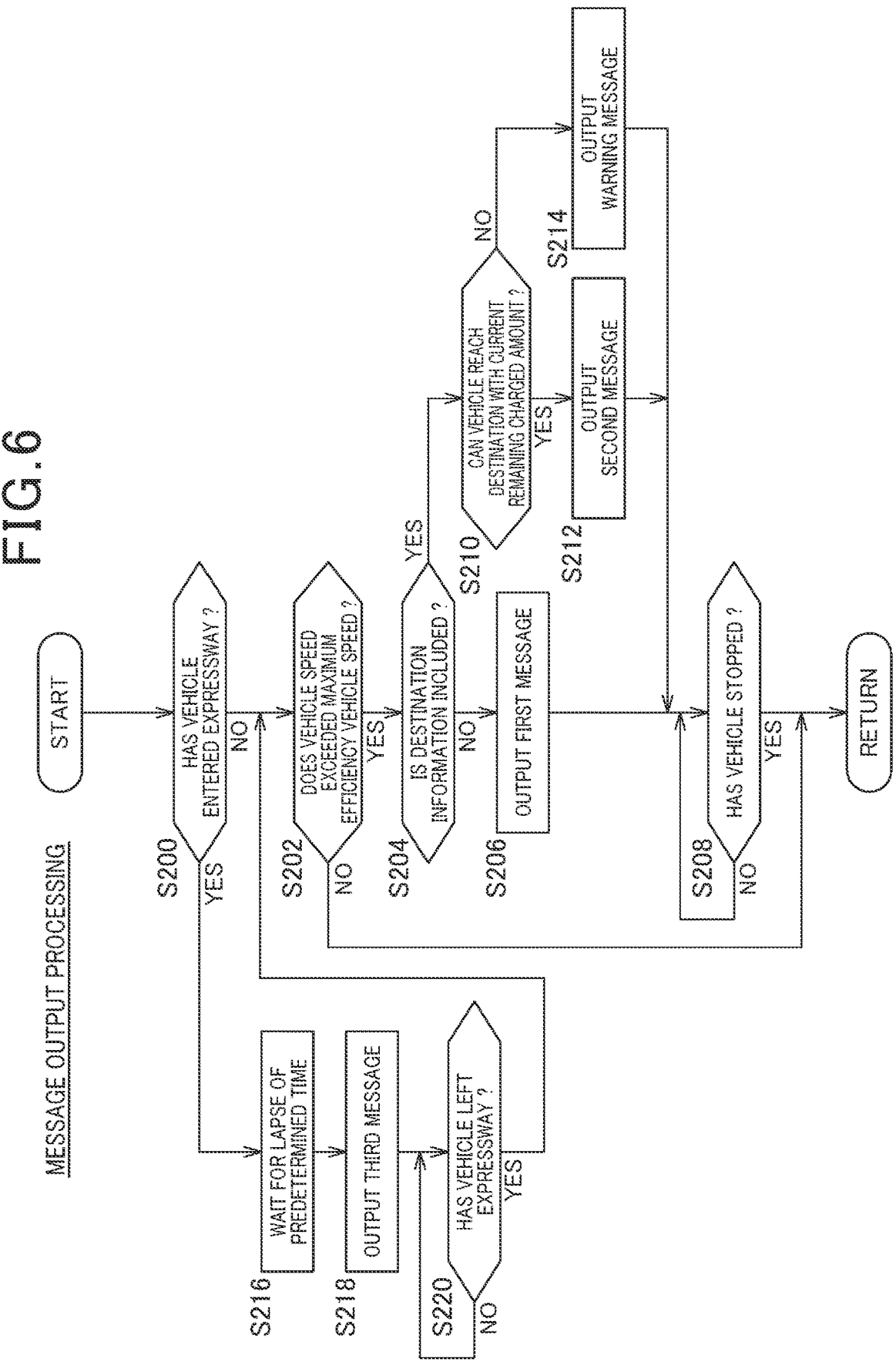
FIG. 6 is a flowchart illustrating details of message output processing in the flowchart illustrated in FIG. 5.

FIG. 6 is a flowchart illustrating a procedure for message output processing in step S110 illustrated in FIG. 5.

When the processing is started, the information presentation unit 58 determines whether the vehicle 2 has entered an expressway (S200). If the vehicle 2 has not entered the expressway (NO in step S200), the information presentation unit 58 determines whether the current vehicle speed of the vehicle 2 exceeds the maximum efficiency vehicle speed in the electricity consumption characteristics (S202). If the current vehicle speed does not exceed the maximum efficiency vehicle speed (NO in step S202), the information presentation unit 58 terminates the message output processing.

On the other hand, when the current vehicle speed exceeds the maximum efficiency vehicle speed (YES in step S202), the information presentation unit 58 determines whether destination information is included (S204). For example, when the assistance request from the terminal device 6 as a trigger for starting the processing illustrated in FIG. 5 includes destination information, the information presentation unit 58 determines that the destination information is included.

If the destination information is not included (NO in step S204), the information presentation unit 58 instructs the terminal device 6 to output a first message to inform the user U as the occupant of the vehicle 2 that the cruising range increases as the vehicle speed is decreased (S206). In response to this, the terminal device 6 outputs, for example, the first message from the speaker 33 and/or on the display screen of the touch panel 32 in the form of an audio message and/or a text message as a push notification.

Next, the information presentation unit 58 determines whether the vehicle 2 has stopped based on the current vehicle speed (S208). If the vehicle 2 has not stopped (NO in step S208), the information presentation unit 58 returns to step S208 to repeatedly perform the processing, and waits for the vehicle 2 to stop. On the other hand, if the vehicle 2 has stopped (YES in step S208), the information presentation unit 58 terminates the message output processing.

On the other hand, in step S204, if the destination information is included (YES in step S204), the information presentation unit 58 determines whether the vehicle 2 can reach the destination with the current remaining charged amount (S210). If the vehicle 2 can reach the destination with the current remaining charged amount by adjusting the vehicle speed (YES in step S210), the information presentation unit 58 instructs the terminal device 6 to output a second message to inform the user U of the upper-limit vehicle speed at which the vehicle 2 can reach the destination (S212). In response to this, the terminal device 6 outputs, for example, the second message from the speaker 33 and/or on the display screen of the touch panel 32 as an audio message and/or a text message as a push notification. After that, the information presentation unit 58 shifts the processing to step S208.

On the other hand, in step S210, if it is determined that the vehicle 2 cannot reach the destination with the current remaining charged amount even by adjusting the vehicle speed (NO in step S210), the information presentation unit 58 instructs the terminal device 6 to output a warning message such as a message "the vehicle cannot reach the destination with the current remaining charged amount" (S214), and then shifts the processing to step S208.

On the other hand, in step S200, if it is determined that the vehicle 2 has entered the expressway (YES in step S200), the information presentation unit 58 waits for a lapse of a predetermined time (S216), and then instructs the terminal device 6 to output, as the recommendation notification, a third message indicating that the cruising range increases as the vehicle speed is decreased to the user U (S218). In response to this, the terminal device 6 outputs, for example, the third message from the speaker 33 and/or on the display screen of the touch panel 32 as an audio message or a text message, as a push notification.

Next, the information presentation unit 58 determines whether the vehicle 2 has left the expressway based on the current position of the vehicle 2 and the map information (S220). If the vehicle 2 has not left the expressway (NO in step S220), the information presentation unit 58 returns to step S220 to repeatedly execute the processing and then waits for the vehicle 2 to leave the expressway. On the other hand, if it is determined that the vehicle 2 has left the expressway (YES in step S220), the information presentation unit 58 shifts the processing to step S202.

7. Other Embodiments

In the embodiments described above, the display of the reachable range and the advice message are output from the terminal device 6 serving as a mobile terminal device. Alternatively, in a case where the vehicle 2 includes in-vehicle devices including human machine interfaces such as a display device and a speaker (e.g., a so-called display audio device or the like), the display of the reachable range and the advice message may be output from such in-vehicle devices.

The electricity consumption characteristics of the vehicle 2 can be dependent on the temperature of the battery 7. Accordingly, the electricity consumption information 22 stored in the first memory 21 of the information provision apparatus 3 in the vehicle 2 may include a plurality of pieces of data on electricity consumption characteristics for some temperatures. The characteristic information unit 25 can transmit, to the assistance server 4, electricity consumption information based the current temperature of the battery 7, such as electricity consumption information with respect to a temperature closest to the current temperature of the battery 7, or electricity consumption information with respect to the current temperature of the battery 7 calculated based on the electricity consumption information with respect to a plurality of temperatures by interpolation.

In the embodiments described above, the electricity consumption characteristics included in the electricity consumption information 22 are preliminarily stored. Alternatively, the characteristic information unit 25 may create the electricity consumption characteristics based on actual traveling data on the vehicle 2 obtained from the vehicle control device 13.

Note that the present invention is not limited to the configurations in the above-described embodiments, and can be carried out in various modes without departing from the gist of the invention.

8. Configurations Supported by Embodiments Described Above

The above-described embodiments support the following configurations.

(Configuration 1) A driver assistance system comprising: a calculation unit configured to calculate a cruising range as a distance at which a vehicle to be driven by power supplied from a battery can travel with a current remaining charged amount of the battery; and an information presentation unit configured to display, on a display device, a reachable range as a reachable position range within the cruising range from a current position of the vehicle, wherein the calculation unit calculates an open road cruising range as the cruising range in a case where an open road is used and/or an expressway cruising range as the cruising range in a case where a nearest expressway from the current position is used, and wherein the information presentation unit displays an open road reach range and an expressway reach range such that an end point of the expressway reach range as the reachable range in a case where the expressway is used is located closer to the current position of the vehicle than an outer edge of the open road reach range as the reachable range in a case where the open road is used.

In the driver assistance system according to Configuration 1, the reachable ranges in a case where the vehicle travels on two types of roads, i.e., an open road and an expressway, at different speed limits or general average vehicle speeds, respectively, are displayed. This makes it possible to effectively assist a driver to select a traveling road and/or a speed on each road so as to achieve a longer cruising range.

(Configuration 2) The driver assistance system according to Configuration 1, further comprising a display control unit configured to display, on the display device, the open road reach range and/or the expressway reach range in cooperation with the information presentation unit, wherein the display control unit displays the open road reach range and the expressway reach range in a superimposed manner on a map.

In the driver assistance system according to Configuration 2, the open road reach range and the expressway reach range are displayed in a superimposed manner on a map. This enables a user to intuitively and easily recognize the difference between these reachable ranges.

(Configuration 3) The driver assistance system according to Configuration 1 or 2, wherein the vehicle includes a maximum efficiency vehicle speed as a vehicle speed at which electricity consumption is maximum and largest in electricity consumption characteristics indicating a relationship between the vehicle speed of the vehicle and the electricity consumption as a mileage of the vehicle per unit capacity of the battery, and wherein in a case where the vehicle is traveling at a vehicle speed exceeding the maximum efficiency vehicle speed and the remaining charged amount of the battery is less than a predetermined threshold, the information presentation unit provides an occupant of the vehicle with a notification indicating that the cruising range increases as the vehicle speed is decreased.

In the driver assistance system according to Configuration 3, the driver may adjust the vehicle speed in response to the notification, thereby making it possible to improve the cruising range. Consequently, even if the driver is not accustomed to driving an electric vehicle, a situation where the cruising range is unnecessarily reduced can be avoided.

(Configuration 4) The driver assistance system according to any one of Configurations 1 to 3, wherein the vehicle includes a maximum efficiency vehicle speed as a vehicle speed at which electricity consumption is maximum and largest in electricity consumption characteristics indicating a relationship between the vehicle speed of the vehicle and the electricity consumption as a mileage of the vehicle per unit capacity of the battery, and wherein in a case where a current vehicle speed of the vehicle exceeds the maximum efficiency vehicle speed and it is determined that the vehicle cannot reach a destination at the current vehicle speed based on the electricity consumption characteristics, the information presentation unit provides an occupant of the vehicle with a notification about a vehicle speed at which the vehicle can reach the destination based on a current destination and the current position of the vehicle.

In the driver assistance system according to Configuration 4, even if the driver is not accustomed to driving an electric vehicle, the driver can adjust the vehicle speed to reach the destination in response to the notification, which leads to an improvement in user-friendliness for the driver.

(Configuration 5) The driver assistance system according to any one of Configurations 1 to 4, wherein in a case where the vehicle has entered an expressway, the information presentation unit outputs, to an occupant of the vehicle, a recommendation notification indicating that the cruising range increases as the vehicle speed is decreased.

In the driver assistance system according to Configuration 5, even if the driver is not accustomed to driving an electric vehicle, a situation where the driver accidentally uses an expressway in expectation of increasing the cruising range and is embarrassed to know that the cruising range is reduced unexpectedly can be avoided.

(Configuration 6) The driver assistance system according to Configuration 5, in a case where a distance between a position of the expressway and the current position of the vehicle on a map is less than or equal to a predetermined value and a current vehicle speed of the vehicle is more than or equal to a predetermined value, the information presentation unit determines that the vehicle is traveling on the expressway.

In the driver assistance system according to Configuration 6, it can be appropriately determined whether the vehicle is traveling on the expressway.

(Configuration 7) The driver assistance system according to Configuration 5 or 6, wherein the information presentation unit outputs the recommendation notification in a case where a predetermined time has elapsed from time when it is determined that the vehicle is traveling on the expressway.

In the driver assistance system according to Configuration 7, the recommendation notification is issued during a period other than a period in which noise in the vehicle increases as driving motor sound or the like increases when the vehicle is accelerating to enter the expressway. Therefore, the recommendation notification can be appropriately transmitted to the driver.

(Configuration 8) The driver assistance system according to any one of Configurations 1 to 7, wherein the open road reach range and/or the expressway reach range is displayed on a mobile terminal device.

In the driver assistance system according to Configuration 8, information about the readable range is output to the mobile terminal device. This makes it possible to appropriately assist the driver to drive a vehicle even if the vehicle does not include any display device.

(Configuration 9) The driver assistance system according to any one of Configurations 1 to 8, wherein the calculation unit calculates the open road cruising range based on an average vehicle speed on the open road, the current remaining charged amount, and electricity consumption characteristics indicating a relationship between the vehicle speed of the vehicle and electricity consumption as a mileage of the vehicle per unit capacity of the battery, and/or calculates the expressway cruising range based on an average vehicle speed on the expressway, the current remaining charged amount, and the electricity consumption characteristics.

In the driver assistance system according to Configuration 9, the open road cruising range and the expressway cruising range can be easily calculated based on the average vehicle speed on the open road and the average vehicle speed on the expressway.

(Configuration 10) A driver assistance method to be executed by a computer, comprising: a calculation step of calculating a cruising range as a distance at which a vehicle to be driven by power supplied from a battery can travel with a current remaining charged amount of the battery; and an information presentation step of displaying, on a display device, a reachable range as a reachable position range within the cruising range from a current position of the vehicle, wherein in the calculation step, an open road cruising range as the cruising range in a case where an open road is used and/or an expressway cruising range as the cruising range in a case where a nearest expressway from the current position is used is calculated, and wherein in the information presentation step, an open road reach range and an expressway reach range are displayed such that an end point of the expressway reach range as the reachable range in a case where the expressway is used is located closer to the current position of the vehicle than an outer edge of the open road reach range as the reachable range in a case where the open road is used.

In the driver assistance method according to Configuration 10, the reachable ranges in a case where the vehicle travels on two types of roads, i.e., an open road and an expressway, at different speed limits or general average vehicle speeds, respectively, are displayed. This makes it possible to effectively assist a driver to select a traveling road and/or a speed on each road so as to achieve a longer cruising range.

REFERENCE SIGNS LIST 1 driver assistance system
2 vehicle 3 information provision apparatus
4 assistance server
5 communication network
6 terminal device
7 battery
10 vehicle network bus
11 communication unit
12 first GNSS sensor
13 vehicle control device
14 driving motor
20 first processor
21 first memory
22 electricity consumption information
23 first program
24 state notification unit
25 characteristic information unit
30 first communication unit
31 second GNSS sensor
32 touch panel
33 speaker
34 microphone
40 second processor
41 second memory
42 second program
43 request unit
44 display control unit
45 notification unit
50 third processor
51 third memory
52 third communication unit
53 registration information
54 map information
55 third program
56 reception unit
57 calculation unit
58 information presentation unit
60 graph
70 map
71 vehicle icon
72 open road reach range
73 expressway reach range
74 expressway range button
75 open road range button
76 stand display button
77 enlargement/reduction button
78 display identification box

What is claimed is:

1. A driver assistance system comprising:
a calculation unit configured to calculate a cruising range as a distance at which a vehicle to be driven by power supplied from a battery can travel with a current remaining charged amount of the battery; and
an information presentation unit configured to display, on a display device, a reachable range as a reachable position range within the cruising range from a current position of the vehicle,
wherein the calculation unit calculates an open road cruising range as the cruising range in a case where an open road is used and/or an expressway cruising range as the cruising range in a case where a nearest expressway from the current position is used, and
wherein the information presentation unit displays an open road reach range and an expressway reach range such that an end point of the expressway reach range as the reachable range in a case where the expressway is used is located closer to the current position of the vehicle than an outer edge of the open road reach range as the reachable range in a case where the open road is used.

2. The driver assistance system according to claim 1, further comprising a display control unit configured to display, on the display device, the open road reach range and/or the expressway reach range in cooperation with the information presentation unit, wherein the display control unit displays the open road reach range and the expressway reach range in a superimposed manner on a map.

3. The driver assistance system according to claim 1, wherein the vehicle includes a maximum efficiency vehicle speed as a vehicle speed at which electricity consumption is maximum and largest in electricity consumption characteristics indicating a relationship between the vehicle speed of the vehicle and the electricity consumption as a mileage of the vehicle per unit capacity of the battery, and wherein in a case where the vehicle is traveling at a vehicle speed exceeding the maximum efficiency vehicle speed and the remaining charged amount of the battery is less than a predetermined threshold, the information presentation unit provides an occupant of the vehicle with a notification indicating that the cruising range increases as the vehicle speed is decreased.

4. The driver assistance system according to claim 1, wherein the vehicle includes a maximum efficiency vehicle speed as a vehicle speed at which electricity consumption is maximum and largest in electricity consumption characteristics indicating a relationship between the vehicle speed of the vehicle and the electricity consumption as a mileage of the vehicle per unit capacity of the battery, and wherein in a case where a current vehicle speed of the vehicle exceeds the maximum efficiency vehicle speed and it is determined that the vehicle cannot reach a destination at the current vehicle speed based on the electricity consumption characteristics, the information presentation unit provides an occupant of the vehicle with a notification about a vehicle speed at which the vehicle can reach the destination based on a current destination and the current position of the vehicle.

5. The driver assistance system according to claim 1, wherein in a case where the vehicle has entered an expressway, the information presentation unit outputs, to an occupant of the vehicle, a recommendation notification indicating that the cruising range increases as the vehicle speed is decreased.

6. The driver assistance system according to claim 5, wherein in a case where a distance between a position of the expressway and the current position of the vehicle on a map is less than or equal to a predetermined value and a current vehicle speed of the vehicle is more than or equal to a predetermined value, the information presentation unit determines that the vehicle is traveling on the expressway.

7. The driver assistance system according to claim 5, wherein the information presentation unit outputs the recommendation notification in a case where a predetermined time has elapsed from time when it is determined that the vehicle is traveling on the expressway.

8. The driver assistance system according to claim 1, wherein the open road reach range and/or the expressway reach range is displayed on a mobile terminal device.

9. The driver assistance system according to claim 1, wherein the calculation unit calculates the open road cruising range based on an average vehicle speed on the open road, the current remaining charged amount, and electricity consumption characteristics indicating a relationship between the vehicle speed of the vehicle and electricity consumption as a mileage of the vehicle per unit capacity of the battery, and/or calculates the expressway cruising range based on an average vehicle speed on the expressway, the current remaining charged amount, and the electricity consumption characteristics.

10. A driver assistance method to be executed by a computer, comprising:
- a calculation step of calculating a cruising range as a distance at which a vehicle to be driven by power supplied from a battery can travel with a current remaining charged amount of the battery; and
- an information presentation step of displaying, on a display device, a reachable range as a reachable position range within the cruising range from a current position of the vehicle,
- wherein in the calculation step, an open road cruising range as the cruising range in a case where an open road is used and/or an expressway cruising range as the cruising range in a case where a nearest expressway from the current position is used is calculated, and
- wherein in the information presentation step, an open road reach range and an expressway reach range are displayed such that an end point of the expressway reach range as the reachable range in a case where the expressway is used is located closer to the current position of the vehicle than an outer edge of the open road reach range as the reachable range in a case where the open road is used.

* * * * *